United States Patent
Iida et al.

(10) Patent No.: US 6,483,560 B2
(45) Date of Patent: Nov. 19, 2002

(54) LIQUID CRYSTAL DEVICE HAVING METAL LIGHT SHIELDING LAYER WITH PORTIONS AT DIFFERENT POTENTIALS

(75) Inventors: Masayuki Iida, Kanagawa (JP); Satofumi Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/036,961

(22) Filed: Dec. 21, 2001

(65) Prior Publication Data

US 2002/0057404 A1 May 16, 2002

Related U.S. Application Data

(62) Division of application No. 08/931,787, filed on Sep. 17, 1997, now Pat. No. 6,388,723.

(30) Foreign Application Priority Data

Sep. 18, 1996 (JP) .............................. 8-267815

(51) Int. Cl.[7] ............................................ G02F 1/1343
(52) U.S. Cl. ...................................... 349/111; 349/151
(58) Field of Search ................................ 349/110, 111, 349/151

(56) References Cited

U.S. PATENT DOCUMENTS 5,392,145 A * 2/1995 Edwards .................... 349/111
6,388,723 B1 * 5/2002 Iida et al. ................... 349/111

FOREIGN PATENT DOCUMENTS

JP 06-214226 * 8/1994
JP 08-171082 * 7/1996

* cited by examiner

Primary Examiner—Kenneth Parker
(74) Attorney, Agent, or Firm—Sonnenschein, Nath & Rosenthal (57) ABSTRACT

The present invention provides a liquid crystal display device which is capable of suppressing occurrence of an electric field between a metal light shielding layer and a metal interconnecting layer in a peripheral circuit portion, and preventing disconnection of the metal interconnecting layer due to corrosion, and which has improved reliability under conditions where light and heat are present. In the liquid crystal display device, a metal light shielding layer is formed in a pattern reverse to a metal interconnecting layer 13 on the metal interconnecting layer on the driving substrate side. The potential of the metal light shielding layer is set to the same potential as the potential Vss of the metal interconnecting layer. On the metal light shielding layer is provided a transparent electrode through a flattening film. The transparent electrode is set to the same potential (=the potential of auxiliary capacitor or capacitance Cs) as a counter electrode on the counter substrate side. Since no potential difference occurs between the metal light shielding layer and the metal interconnecting layer, even under conditions where water, impurities, light and heat are present, no chemical reaction (corrosion) takes place due to the occurrence of an electric field, thereby eliminating the possibility of disconnection of the metal interconnecting layer.

2 Claims, 5 Drawing Sheets

LIQUID CRYSTAL DEVICE HAVING METAL LIGHT SHIELDING LAYER WITH PORTIONS AT DIFFERENT POTENTIALS

RELATED APPLICATION DATA

This patent is a divisional application of U.S. Ser. No. 08/931,787 filed on Sep. 17, 1997, now U.S. Pat. No. 6,388,323. Moreover, this patent claims priority to Japanese Application No. P08267815, filed Sep. 18, 1997. Both of these applications are incorporated by reference to the extent permitted by law.

BACKGROUND OF THE INVENTION

The present invention includes a liquid crystal display device, for example, used for a VTR (Video Tape Recorder) with a camera integrated thereto, a liquid crystal projector and the like, and particularly to a liquid crystal display device having a so-called on chip black matrix (optically compensated birefringence or OCB) structure in which a metal light shielding layer referred to as a black mask is provided on the driving substrate side.

In recent years, as an electronic apparatus with a liquid crystal display device, such as a liquid crystal projector, has been popularized, the liquid crystal display device has increasingly been required to have high performance, and improvement to achieve a liquid crystal display device having higher definition and higher luminance has progressed. Such a liquid crystal display device conventionally comprises a substrate (referred to as a "driving substrate" hereinafter) on which pixel electrodes, thin film transistors (TFTs) for controlling the respective electrodes, auxiliary capacitor or capacitance Cs etc. are formed, a substrate (referred to as a "counter substrate" hereinafter) on which a color filter (in the case of a color liquid crystal panel), a metal light shielding layer (black mask), etc. are formed, and a liquid crystal layer held between both substrates.

Although the liquid crystal display device having the above construction requires precise alignment between the driving substrate and the counter substrate which are spaced, precise alignment becomes difficult as the definition of pixels increases. Therefore, a so-called on chip color filter structure is proposed in which a color filter is formed on the driving substrate side (refer to Japanese Patent Unexamined Publication No. 254217). In this on chip color filter structure, since the color filter is overlapped with each of the pixel electrodes, no parallax occurs between the pixel electrodes and the color filter, and the effective opening ratio of the pixel portion can be increased, as compared with a conventional structure in which a color filter is provided on the counter substrate side. There is also the advantage that since substantially no error occurs in alignment between the pixel electrodes and the color filter, a high opening ratio can be maintained even if the pixel portion becomes fine. Besides the on chip color filter structure, in order to increase the effective opening ratio of the display device having a so-called on chip black matrix structure has recently been proposed in which a metal light shielding layer (black mask) is also formed on the driving substrate.

Figure 6:
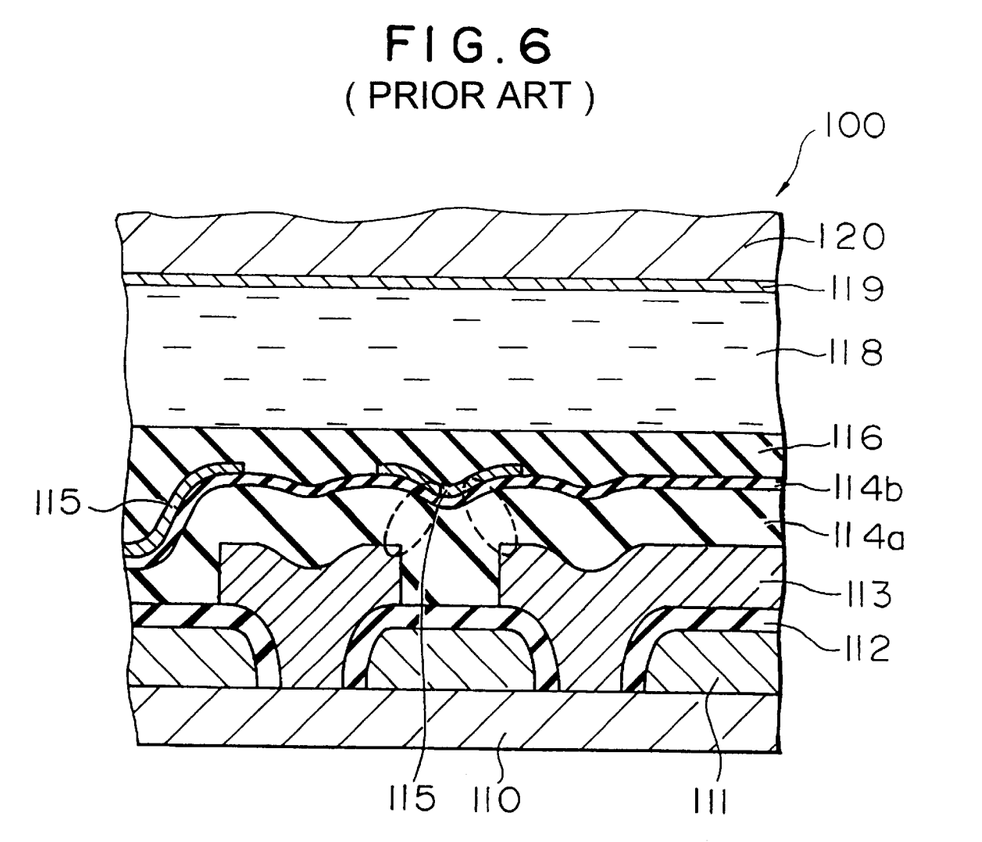
FIG. 6 is a sectional view showing the structure of a peripheral circuit portion of a liquid crystal display device which has been previously proposed.

FIG. 6 shows a sectional structure of the peripheral circuit portion (including a horizontal driving circuit, a vertical driving circuit, etc.) around the effective pixel portion in a liquid crystal display 100 having the above structure. Like the conventional effective pixel portion, the conventional peripheral circuit portion comprises a liquid crystal layer 118 held between a driving substrate 110 and a ,counter substrate 120. On the driving substrate 110 is formed a pattern of a polycrystalline silicon film 111 as a semiconductor thin film which constitutes the TFTs, and an insulating film (SiO2) 112 is formed on the polycrystalline silicon film 111. On the insulating film 112 is formed a metal interconnecting layer 113 comprising aluminum (Al). The potential of this metal interconnecting layer 113 is set to potential Vss. On the metal interconnecting layer 113 are laminated in turn interlayer insulating films 114a and 114b. On the interlayer insulating film 114b is formed a metal light shielding layer (black mask) 115 having a pattern reverse to the metal interconnecting layer 113, and a flattening layer 116 is formed on the pattern of the metal light shielding layer 115. On the other hand, on the counter face of the counter substrate 120 is formed a counter electrode 119. The liquid crystal layer 118 is held between the counter electrode 119 and the driving substrate 110.

In the liquid crystal display device 100, the metal light shielding layer 115 on the driving substrate side is set to the same potential as the potential of the counter electrode 119 on the counter substrate side and an auxiliary capacitor or capacitance Cs of the pixel portion. This is a measure for preventing application of a DC voltage to the liquid crystal layer 118 held between the driving substrate 110 and the counter substrate 120. However, not only the effective pixel potion, but also the metal light shielding layer 115 on the peripheral circuit portion are set to the same potential. Therefore, a strong electric field occurs due to a potential difference between the metal light shielding layer 115 and the metal interconnecting layer (Al wiring layer) 113 at potential Vss, and impurity ions present in the periphery are attracted. As a result, water chemically reacts with aluminum (Al) on the cathode (the metal interconnecting layer 113) side, thereby causing disconnection due to corrosion of aluminum. The metal light shielding layer 115 on the peripheral circuit portion is formed in a pattern reverse to the metal interconnecting layer 113 under the metal light shielding layer 115, i.e., so that both layers do not overlap each other, as viewed from the upper side. Therefore, in a portion where the pattern of the metal light shielding layer 115 is absent, incident light is cut off by the metal interconnecting layer 113. Thus, in a portion where the pattern of the metal interconnecting layer 113 is large, large quality of light is incident, and the above chemical reaction of aluminum is accelerated by light and heat, thereby more easily causing disconnection. Further, this disconnection allows light irradiation of the active layer 11 of the thin film transistors (TFTs) provided under the metal interconnecting layer 113, and thus has an adverse effect on the operation, such as variation in operation points of the TFTs. Particularly, when the liquid crystal display device 100 is used for a projector or the like, this brings about a large problem with respect to reality. When electrical leakage from the metal interconnection layer 113 of the peripheral circuit portion occurs, the liquid crystal display device 100 becomes defective regardless of the position of leakage.

SUMMARY OF THE INVENTION

The present invention has been achieved in consideration of the above problems, and an object of the invention is to provide a liquid crystal display device which is capable of suppressing occurrence of an electric field between a metal light shielding layer and a metal interconnecting layer in the peripheral circuit portion to prevent disconnection of the metal interconnecting layer, and which has improved reliability under conditions where light and heat are present.

In order to achieve the object, in accordance with an aspect of the present invention, there is provided a liquid crystal display device comprising a first substrate in which a pixel portion having a plurality of pixel electrodes, and a peripheral circuit portion disposed around the pixel portion are formed, and which comprises a metal interconnecting layer provided in the peripheral circuit portion and set to a second potential, and a metal light shielding layer which is selectively provided in a pattern reverse to the metal interconnecting layer in each of regions of the pixel portion and the peripheral circuit portion, and which is set to a first potential in a region corresponding to the pixel portion and set to the second potential in a region corresponding to the peripheral circuit portion; a second substrate disposed opposite to the first substrate with a predetermined space and having a counter electrode set to the first potential; and a liquid crystal layer held between the first and second substrates. The liquid crystal display device further comprises a transparent electrode formed on the metal light shielding layer of the peripheral circuit portion and set to the first potential.

In accordance with another aspect of the present invention, there is provided a liquid crystal projector comprising a liquid crystal panel comprising a first substrate in which a pixel portion having a plurality of pixel electrodes, and a peripheral circuit portion disposed around the pixel portion are formed, and which comprises a metal interconnecting layer provided in the peripheral circuit portion and set to a second potential, and a metal light shielding layer which is selectively provided in a pattern reverse to the metal interconnecting layer in each of regions of the pixel portion and the peripheral circuit portion, and which is set to a first potential in a region corresponding to the pixel portion and set to the second potential in a region corresponding to the peripheral circuit portion; a second substrate disposed opposite to the first substrate with a predetermined space and having a counter electrode set to the first potential; and a liquid crystal layer held between the first and second substrates; and optical means for applying light to the liquid crystal panel and enlarging and projecting transmitted light from the liquid crystal panel.

In accordance with a further aspect of the present invention, there is provided a liquid crystal display device comprising a first substrate in which a pixel portion having a plurality of pixel electrodes, and a peripheral circuit portion disposed around the pixel portion are formed, and which comprises a metal interconnecting layer provided in the peripheral circuit portion and set to a second potential, and a metal light shielding layer which is selectively provided in a pattern reverse to the metal interconnecting layer in each of regions of the pixel portion and the peripheral circuit portion, and which is set to a first potential in a region corresponding to the pixel portion and set to an electrically floating state in a region corresponding to the peripheral circuit portion; a second substrate disposed opposite to the first substrate with a predetermined space and having a counter electrode set to the first potential; and a liquid crystal layer held between the first and second substrates.

In accordance with a still further aspect of the present invention, there is provided a liquid crystal display device comprising a first substrate in which a pixel portion having a plurality of pixel electrodes, and a peripheral circuit portion disposed around the pixel portion are formed, and which comprises a metal interconnecting layer provided in the peripheral circuit portion and set to a second potential, and a metal light shielding layer which is provided over the entire surface of the peripheral circuit portion to prevent entrance of light into the metal interconnecting layer, and which is set to a first potential; a second substrate disposed opposite to the first substrate with a predetermined space and having a counter electrode set to the first potential; and a liquid crystal layer held between the first and second substrates.

DESCRIPTION OF THE PREFERRED EMBODIMENTS

Embodiments of the present invention will be described in detail below with reference to the drawings.

First Embodiment

Figure 2:
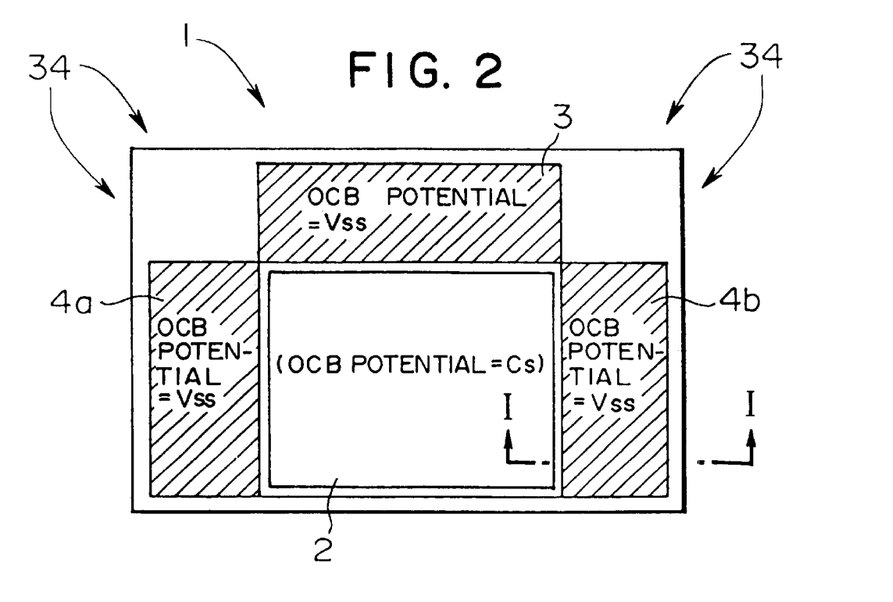
FIG. 2 is a plan view schematically showing the entire construction of the liquid crystal display device in accordance with the first embodiment of the invention.

FIG. 2 shows a plan of a panel of a liquid crystal display device 1 in accordance with a first embodiment of the present invention. The liquid crystal display device 1 comprises a driving substrate 10 including transparent pixel electrodes respectively arranged in a matrix for a plurality of pixels, a counter substrate 20 including a counter electrode 19 corresponding to the pixel electrodes and disposed opposite to the driving substrate 10 with a predetermined space there between, and a liquid crystal layer 18 held between the driving substrate 10 and the counter substrate. The liquid crystal display device 1 has a so-called on chip black matrix (OCB) structure in which a metal light shielding layer 15 (black mask) is formed on the driving substrate side, for shielding the periphery of each of the pixel electrodes from light. The metal light shielding layer comprises a metal having the shielding ability, such as tungsten (W), titanium (Ti), ,aluminum (Al) or the like.

The liquid crystal display device 1 comprises an effective pixel portion 2, and a peripheral circuit portion 34 provided around the effective pixel portion 2 and including a horizontal driving portion 3 and two vertical driving portions 4a and 4b, as viewed from the upper side thereof. The effective pixel portion 2 contains the pixel electrodes, the TFT 11 serving as a switching element for driving each of the pixel electrodes, etc. which are provided on the driving substrate 10 side. Although not shown in the drawing, an auxiliary capacitor or capacitance line is provided along the column direction of the pixels to form an auxiliary capacitor or capacitance (additional capacitor or capacitance) Cs between the capacitor or capacitance line and the semiconductor thin film 11 (polycrystalline silicon film) which constitutes the TFTs. The auxiliary capacitor or capacitance line for forming the auxiliary capacitor or capacitance Cs is internally connected to the counter electrode 19 on the counter substrate 20 side, which will be described below, so that both are set to the same potential (first potential).

In this embodiment, the metal light shielding layer 15 (OCB) on the driving substrate 10 side is set to different potentials in the effective pixel portion 2 and the peripheral circuit portion comprising the horizontal driving portion 2 and the two vertical driving portions 4a and 4b. Namely, the potential of the metal light shielding layer 15 of the effective pixel portion 2 is the same as the potential of the counter electrode 19 on the counter substrate 20 side and the auxiliary capacitor or capacitance Cs. On the other hand, the potential of the metal light shielding layer 15 in each of the horizontal driving portion 3 and the two vertical driving portions 4a and 4b, which constitute the peripheral circuit portion, is the same as the potential Vss (second potential) of the metal interconnecting layer 13.

Figure 1:
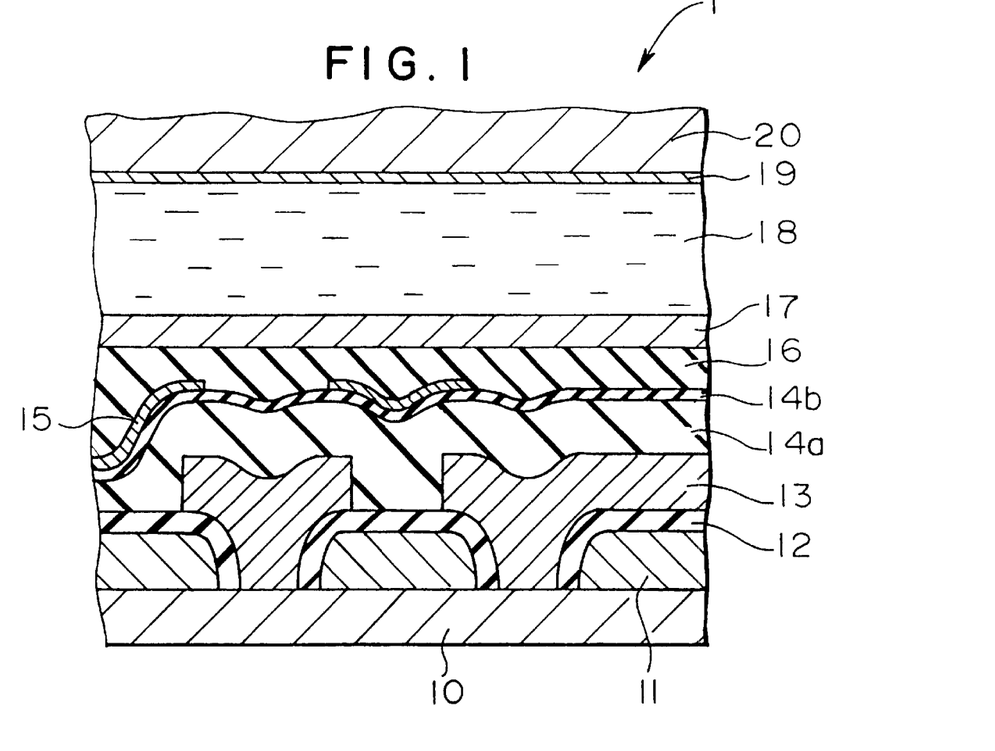
FIG. 1 is a sectional view showing the structure of a peripheral circuit portion of a liquid crystal display device in accordance with a first embodiment of the invention.

FIG. 1 shows an example of the sectional configuration of the peripheral circuit portion shown 34 in FIG. 2. FIG. 1 shows the sectional configuration of the vertical driving portion 4b taken along line I—I in FIG. 2. In the vertical driving portion 4b, the liquid crystal layer 18 is held between the driving substrate 10 and the counter substrate 20, as in the effective pixel portion 2 (FIG. 2). The driving substrate 10 comprises, for example, a transparent substrate made of glass or the like. On the driving substrate 10 is formed a pattern of a polycrystalline silicon film 11 serving as a semiconductor thin film which constitutes the TFTs, for example, by sputtering. On the polycrystalline silicon film 11 is formed an insulating film (for example, a silicon oxide (SiO2) film) 12. on the insulating layer 12 is formed a metal interconnecting layer 13 comprising aluminum (Al) whose potential is set to Vss (the second potential). On the metal interconnecting layer 13 are laminated in turn an interlayer insulating layer (e.g., a PSG (Phosphorus Silicate Glass) film) 14a formed by, for example, CVD (Chemical Vapor Deposition), and an interlayer insulating film (SiN (silicon nitride film) 14b formed by, for example, plasma CVD. On the interlayer insulating film 14b is formed a metal light shielding layer 15 having a pattern reverse to the metal interconnecting layer 13. As described above, the potential of the metal light shielding layer 15 is set to Vss which is the same potential as the metal 14 interconnecting layer 13. On the pattern of the metal light shielding layer 15 is provided a flattening film 16, for example, comprising an acrylic resin. In this embodiment, on the flattening film 16 is further formed a plate-shaped transparent electrode 17. The transparent electrode 17 is formed at the same time as formation of the transparent electrode in the effective pixel portion 2. It is thus possible to form the transparent electrode 17 without changing a conventional process.

On the other hand, the counter substrate 20 comprises a transparent substrate, as the driving substrate 10, and it has a transparent counter electrode 19 formed on the surface thereof opposite to the driving substrate 20. The liquid crystal layer 18 is held between the counter electrode 19 and the transparent electrode 17 on the driving substrate 20 side. The transparent electrode 17 on the driving substrate 20 side is electrically connected so that the potential thereof is the same as the potential the potential of an auxiliary capacitor or capacitance Cs) of the counter electrode 19 on the counter substrate side.

The operation and effect of the liquid crystal display device 1 in accordance with this embodiment will be described below.

As described above, in a conventional liquid crystal display device (such as liquid crystal display 100 of FIG. 6), in order to prevent deterioration in the liquid crystal layer 118 held between two substrates 110, 120 due to application of a DC voltage to the liquid crystal layer, the metal light shielding layer 115 (black mask) on the driving substrate 110 side is set to the potential (=Cs potential) of the counter electrode 119 in both the effective pixel portion and the peripheral circuit portion. Therefore, a strong electric field occurs in a region on the peripheral circuit portion (the horizontal driving circuit and the vertical driving circuit), for example, in the region shown by broken lines in FIG. 6 between the metal interconnecting layer (Al interconnecting layer) 113 at potential Vss and the metal light shielding layer 115 at the counter electrode potential. As a result, water chemically reacts with aluminum (Al) on the cathode side, and thus disconnection of the metal interconnecting layer might occur due to corrosion of aluminum.

However, in this embodiment, the mask pattern of the metal light shielding layer 15 is divided into a portion in the effective pixel portion 2 and a portion in the peripheral circuit portion including the horizontal driving portion 3 and the vertical driving portions 4a and 4b. Moreover, the potential of the metal light shielding layer 15 in the effective pixel portion 2 is set to the same as the counter electrode 19 and the auxiliary capacitor or capacitance Cs in order to prevent deterioration due to application of a DC voltage to the liquid crystal layer 118. On the other hand, the potential of the metal light shielding layer 15 in each of the horizontal driving portion 3 and the two vertical driving portions 4a and 4b is set to the same as Vss of the metal interconnecting layer 13. This works to prevent the occurrence of a potential difference, as in the conventional liquid crystal display device 100 of FIG. 6. Therefore, no strong electric field occurs between the metal light shielding layer 15 and the metal interconnecting layer 13 even under conditions where water, impurities, light and heat are present, thereby eliminating the possibility of disconnection of the metal interconnecting layer due to occurrence of chemical reaction, apart from a conventional light crystal display device. It is thus possible to improve water resistance, light resistance and heat resistance of the liquid crystal display device 1 of this embodiment.

The above-mentioned construction has the possibility of deterioration in the liquid crystal layer 18 on the peripheral circuit portion due to application of a DC voltage thereto. Therefore, in this embodiment, the transparent electrode 17, at the same potential as the counter electrode 19 on the counter substrate 20 side, is provided on the peripheral circuit portion 34 on the driving substrate side 10, as shown in FIG. 1. This prevents the application of a DC voltage to the liquid crystal layer 18 and thus eliminates the possibility of deterioration in the liquid crystal layer 18 not only on the effective pixel portion 2 but also on the peripheral circuit portion 34. In the peripheral circuit portion, when electrical leakage from the metal interconnecting layer (Al) 113 on the driving substrate 110 side occurs, the panel of a conventional liquid crystal display device 100 becomes defective regardless of the leakage position. However, the liquid crystal display device 1 of this embodiment causes no short circuit if leakage occurs in the metal light shielding layer 15 set to potential Vss, thereby improving the yield of products. Furthermore, in this embodiment, the potential of the metal light shielding layer 15 in the effective pixel portion 2 and the potential of the metal light shielding layer 15 in the peripheral circuit portion 34 including the horizontal driving portion 3 and the vertical driving portions 4a and 4b are separated on the metal interconnecting layer 13. It is thus possible to realize a structure having no or substantially no omission of light.

Second Embodiment

Figure 3:
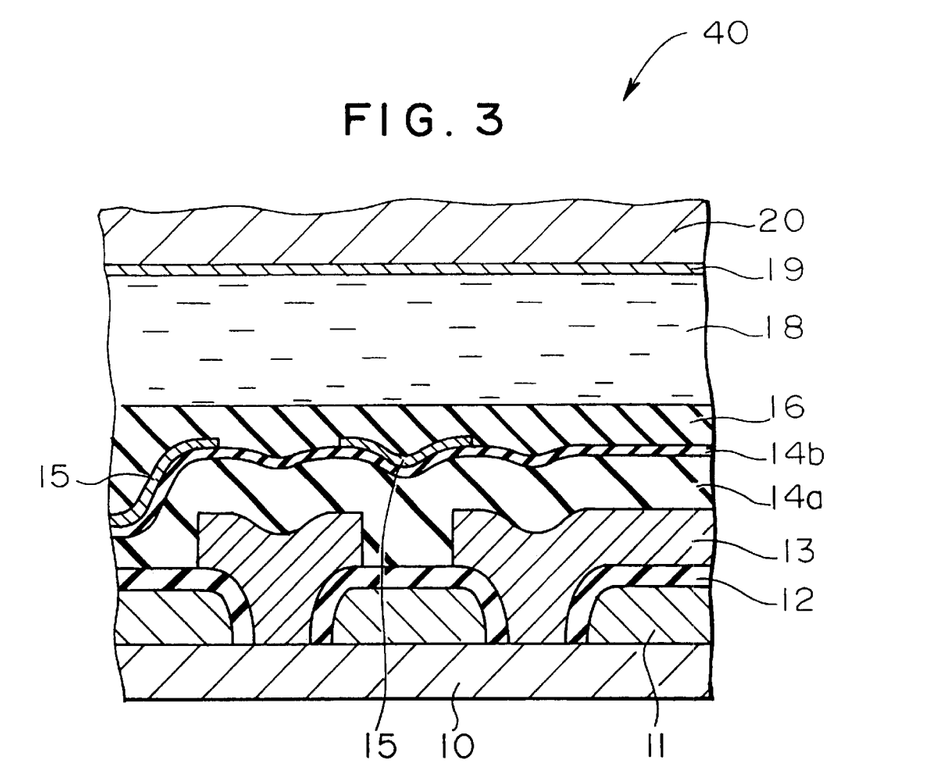
FIG. 3 is a sectional view showing the structure of a peripheral circuit portion of a liquid crystal display device in accordance with a second embodiment of the invention.
Figure 4:
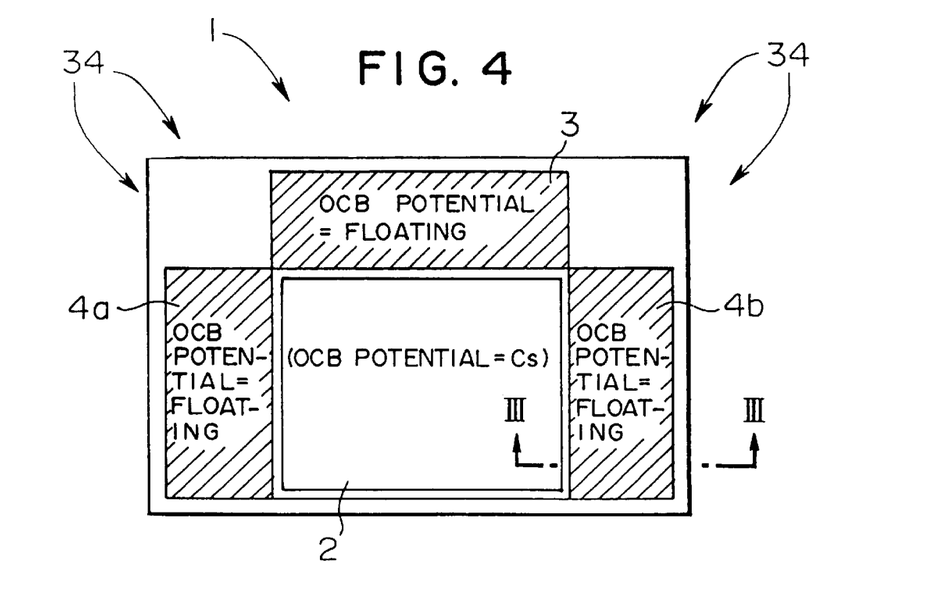
FIG. 4 is a plan view schematically showing the entire construction of the liquid crystal display device in accordance with the second embodiment of the invention.

FIGS. 3 and 4 show the construction of a liquid crystal display device 40 in accordance with a second embodiment of the present invention. FIG. 4 shows the plane construction of a panel 42 of the liquid crystal display, and FIG. 3 shows the sectional construction of the peripheral circuit portion (e.g., the vertical driving portion 4a) of the liquid crystal display device 40. In FIGS. 3 and 4, the same components as those shown in FIGS. 1 and 2 are denoted by the same reference numerals, and description thereof is omitted.

This embodiment is similar to the first embodiment in that the mask pattern of the metal light shielding layer 15 is divided into a portion in the effective pixel portion 2 and a portion in the peripheral circuit portion 34 including the horizontal driving portion 3 and the vertical driving portions 4a and 4b, and the metal light shielding layer 15 in the effective pixel portion 2 is set to the same potential as that of the counter electrode 19 in order to prevent deterioration in the liquid crystal layer due to application of a DC voltage thereto. However, this embodiment is different from the first embodiment in that the metal light shielding layer 15 in each of the horizontal driving portion 3 and the two vertical driving portions 4a and 4b is provided with no electrical contact, such as to metal interconnecting layer 13, so that the potential thereof is in a floating state, thereby eliminating the need for transparent electrode 17 in the peripheral circuit portion 34 on the driving substrate 10 side.

In the above construction, even if chemical reaction due to an electric field takes place between the metal light shielding layer 15 and the metal interconnecting layer 13, no charge moves into the metal light shielding layer 15 in a floating state. Therefore, chemical reaction of water and a metal (Al) is suppressed even under conditions where water, impurities, light and heat are present, and occurrence of disconnection of the metal interconnecting layer 13 due to corrosion can thus be prevented. It is thus possible to improve the water resistance, light resistance and heat resistance of the liquid crystal display device of this embodiment. Other effects are the same as the first embodiment.

Third Embodiment

Figure 5:
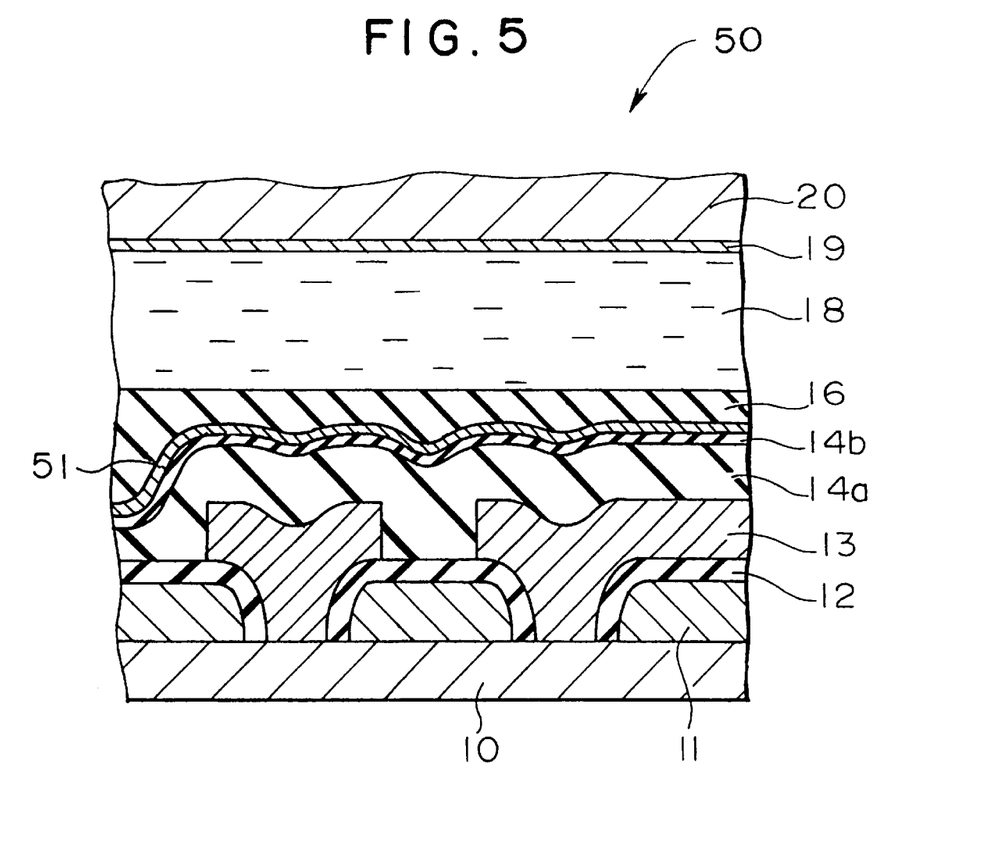
FIG. 5 is a sectional view showing the structure of a peripheral circuit portion of a liquid crystal display device in accordance with a third embodiment of the invention.

FIG. 5 shows the sectional construction of the peripheral circuit portion 34 (e.g., the vertical driving portion 4a or 4b) of a liquid crystal display device 50 in accordance with a third embodiment. In FIG. 5, the same components as those shown in FIGS. 1 and 2 are denoted by the same reference numerals, and description thereof is thus omitted.

This embodiment is different from the first and second embodiments in that a metal light shielding layer 51, whose potential is set to the same potential as the potential (=Cs potential) of the counter electrode 19 on the counter electrode 20 side, is formed over the entire surface of the peripheral circuit portion 34 including the horizontal driving portion 3 and the two vertical driving portions 4a and 4b.

In this construction, incident light is completely cut off by the metal light shielding layer 51 in the peripheral circuit portion 34, and thus light, among other factors which accelerate the chemical reaction, can be removed. Also since the metal light shielding layer 51 can securely prevent entrance of water into the metal interconnecting layer 13 provided under the metal light shielding layer 51, layer 51 can thus suppress occurrence of water as a reactant. In this embodiment, it is thus possible to suppress chemical reaction and prevent occurrence of disconnection of the metal interconnecting layer 13, as in the above embodiments. Therefore, it is possible to improve the light resistance and water resistance of the liquid crystal display device 50 of this embodiment. In this embodiment, since the active layer 11 of the polycrystalline silicon thin film which constitutes the TFTs in the peripheral circuit portion 34 is completely shielded from light, it is possible to prevent the adverse effect of varying the operation points of the TFTs.

Although the present invention has been described above with reference to the embodiments, the present invention is not limited to these embodiments, and various modifications can be made within the equal range of these embodiments. For example, although the above embodiments relate to the horizontal driving portion 3 and the vertical driving portions 4a and 4b in the peripheral circuit portion, the metal interconnecting layer 13 (Al interconnecting layer) at potential Vss is included not only in these driving portions but also in a level conversion portion, a uniformity improving circuit portion, etc. Therefore, if the metal light shielding layer (15 or 51) on these portions is formed according to one of the first to third embodiments, the above-described effect can be further improved.

Fourth Embodiment

Figure 7:
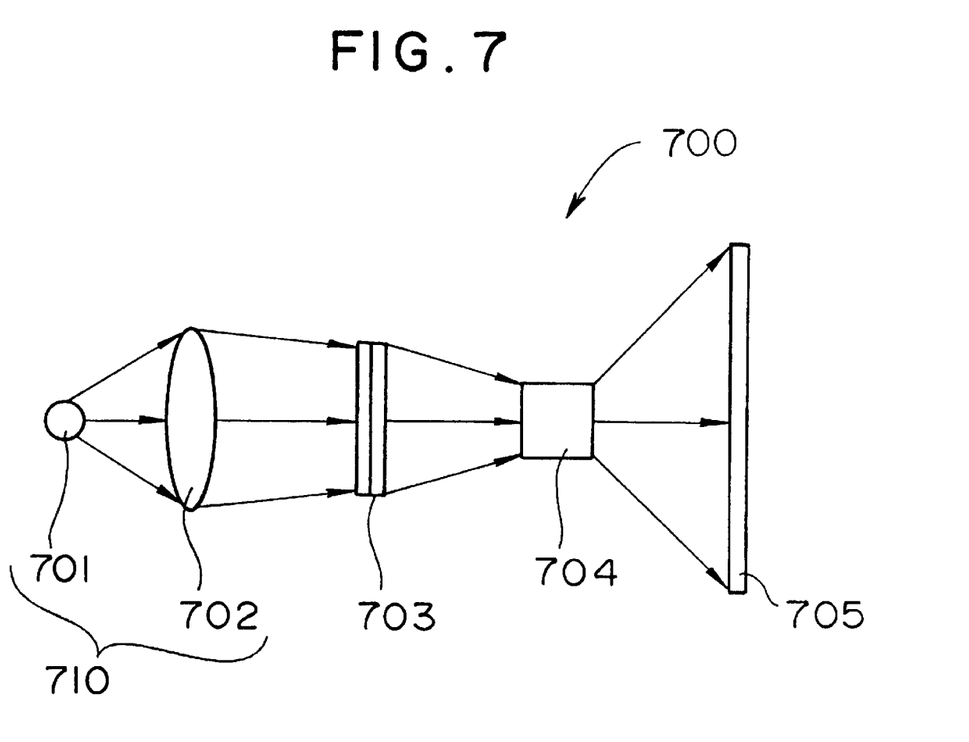
FIG. 7 is a drawing showing an example of a liquid crystal projector comprising a liquid crystal display device of the present invention.

FIG. 7 shows a liquid crystal projector 700 comprising a liquid crystal display device of the present invention in accordance with an embodiment of the invention.

Referring to FIG. 7, a liquid crystal projector 700 comprises a light source 701, a converging lens 702, a liquid crystal panel 703, a projection lens 704 and a screen 705. The light source 701 and the converging lens 702 function as a light emission portion 710, and the liquid crystal panel 703, the projection lens 704 and the screen 705 function as an image formation portion, an image enlarging portion and a display portion, respectively. The liquid crystal panel 703 is provided for each of the three primary colors R, G and B, and lights modulated by the respective liquid crystal panels are synthesized and then projected on the screen 705 by a single projection lens 704. In this case, a color separation optical system and a color synthesizing optical system are also provided.

In the liquid crystal display device 1 of the first embodiment, since the potential of the metal light shielding layer 15 in the peripheral circuit portion 34 is set to the same potential as the metal interconnecting layer 13, no potential difference occurs between the metal interconnecting layer 13 and the metal light shielding layer 15, and the occurrence of an electric field between these layers is also suppressed. Therefore, unlike conventional liquid crystal display device 100 of FIG. 6, there is no possibility that disconnection of the metal interconnecting layer 13 occurs due to chemical reaction, and the effect of improving reliability is exhibited.

In the liquid crystal display device 40 of the second embodiment, since the potential of the metal light shielding layer 15 in the peripheral circuit portion 34 is set to a floating state, even if chemical reaction takes place due to the electric field occurring between the metal interconnecting layer 13 and the metal light shielding layer 15, no movement of charge occurs, and chemical reaction is suppressed. Therefore, there is no possibility of disconnection of the metal interconnecting layer 13, and the effect of improving reliability is exhibited.

In the liquid crystal display device 50 of the third embodiment, since the metal light shielding layer 51 is provided over the entire surface of the peripheral circuit portion 34, and the potential of the metal light shielding layer 51 is set to the same as the counter electrode 19 on the counter substrate 20 side, incident light is completely cut off by the metal light shielding layer 51 in the peripheral circuit portion 34, and light, among other factors which accelerate chemical reaction, is removed. Also it is possible to prevent entrance of water into the metal interconnecting layer 13 and thus suppress occurrence of water as a reactant. Therefore, there is no possibility of disconnection of the metal interconnecting layer 13, and the effect of improving reliability is exhibited.

What is claimed is:

1. A liquid crystal display device, comprising:
   a first substrate divided into a pixel portion and a peripheral circuit portion;
   a plurality of pixel electrodes within the pixel portion;
   a metal interconnecting layer providing metal interconnects in a first pattern over the pixel electrodes at least in the pixel portion, the metal interconnecting layer held to a second potential;
   an insulating layer over the metal interconnecting layer;
   a metallic light shielding layer having a second pattern at least within the pixel portion which is inverse to the first pattern, the metallic light shielding layer being held to a first potential at least within the pixel portion;
   a second substrate opposite the first substrate with a predetermined space therebetween; and
   a liquid crystal layer in the predetermined space,
   wherein the metallic light shielding layer within the peripheral circuit portion is left to float relative to the first and second potentials.

2. A liquid crystal projector comprising:
   a liquid crystal panel comprising:
      a first substrate divided into a pixel portion having a plurality of pixel electrodes and a peripheral circuit portion disposed around the pixel portion;
      a metal interconnecting layer provided in the peripheral circuit portion and set to a second potential, the metal interconnecting layer providing metal interconnects in a first pattern on the pixel electrodes at least in the pixel portion;
      an insulating layer over the metal interconnecting layer;
      a metal light shielding layer which is selectively provided in a second pattern inverse to that of the first pattern of the metal interconnecting layer in each of the pixel portion and the peripheral circuit portion, the metal shielding layer set to a first potential in a region corresponding to the pixel portion and set to the second potential in a region corresponding to the peripheral circuit portion;
      a second substrate disposed opposite to the first substrate with a predetermined space therebetween and having a counter electrode set to the first potential;
      a liquid crystal layer held between the first and second substrates; and
   optical means for applying light to the liquid crystal panel and enlarging and projecting transmitted light from the liquid crystal panel,
   wherein the light shielding layer within the peripheral circuit portion is left to float relative to the first and second potentials.

* * * * *